2 Sheets--Sheet 1.

S. WILKERSON, Jr.
Apparatus for Raising, Emptying, and Filling Sacks.
No. 146,117. Patented Dec. 30, 1873.

Witnesses,
Harry Smith
Thomas McIlvain

Saml. Wilkerson Jr.
by his Attys.
Howsen and Son.

AM. PHOTO-LITHOGRAPHIC Co. N.Y. (OSBORNE'S PROCESS)

S. WILKERSON, Jr.
Apparatus for Raising, Emptying, and Filling Sacks.
No. 146,117. Patented Dec. 30, 1873.
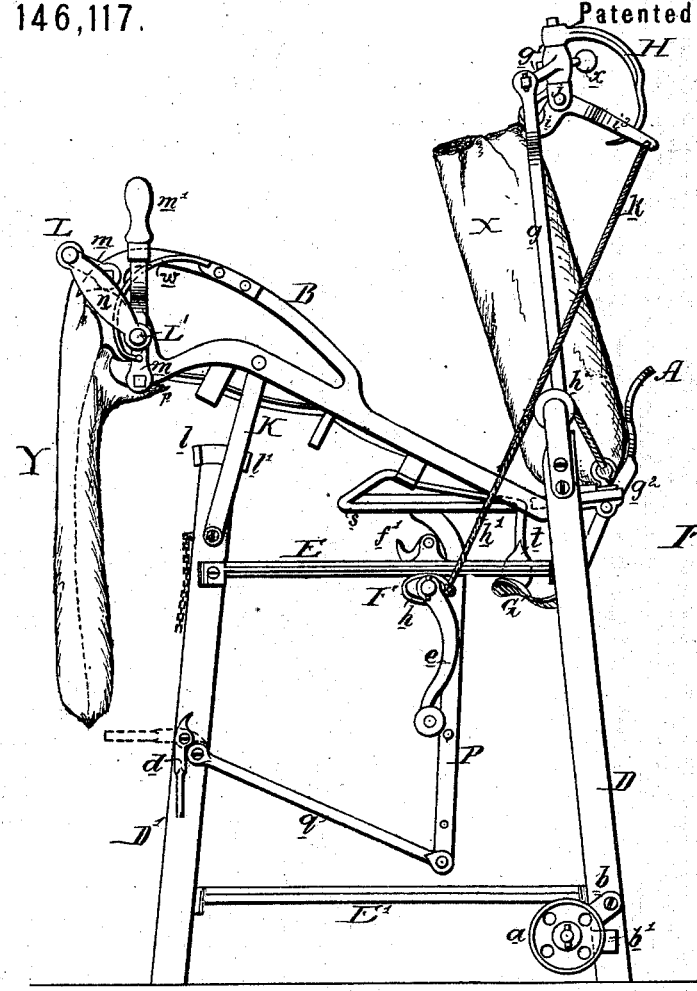
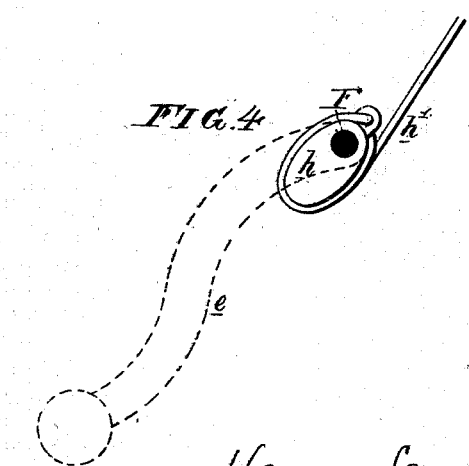
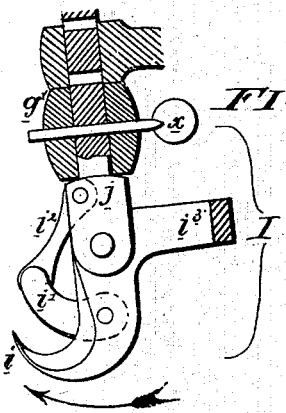

UNITED STATES PATENT OFFICE.

SAMUEL WILKERSON, JR., OF BASSINGBOURN, ENGLAND.

IMPROVEMENT IN APPARATUS FOR RAISING, EMPTYING, AND FILLING SACKS.

Specification forming part of Letters Patent No. 146,117, dated December 30, 1873; application filed November 7, 1873.

*To all whom it may concern:*

Figure 1:
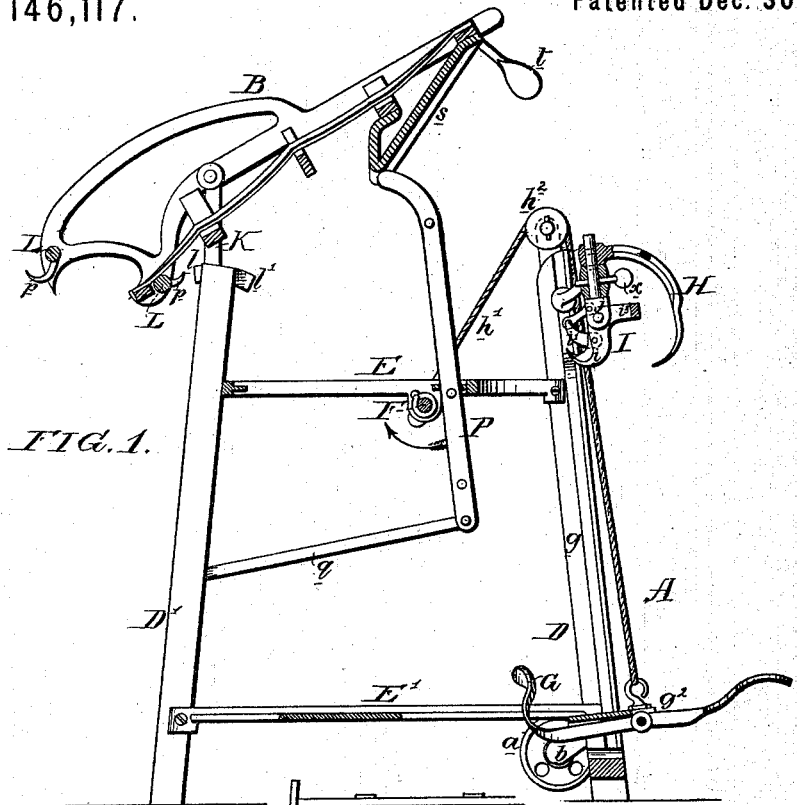
Figure 2:
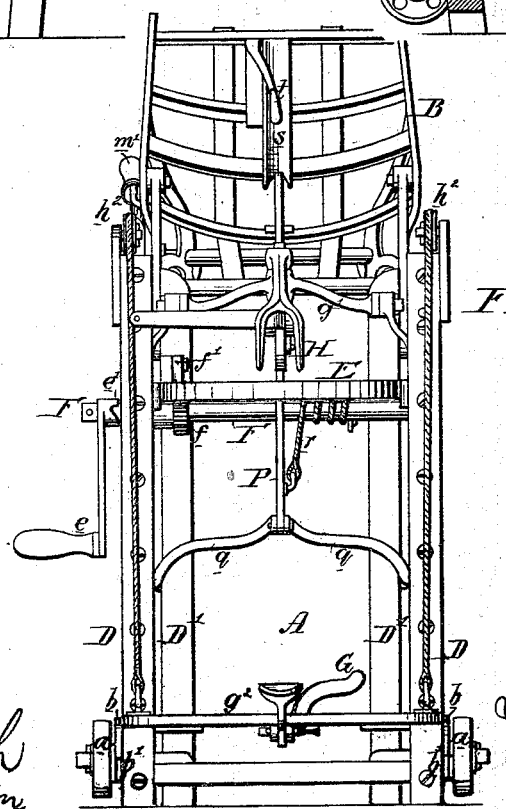

Be it known that I, SAMUEL WILKERSON, Jr., of Bassingbourn, in the county of Cambridge, England, have invented certain Apparatus for Raising, Emptying, and Filling Sacks, of which the following is a specification:

The main object of my invention is to rapidly and automatically empty the contents of one sack into another by the apparatus illustrated in the sectional elevation, Figure 1, end elevation, Fig. 2, and side elevation, Fig. 3, Sheets 1 and 2 of the accompanying drawing, the principal features of the said apparatus being an elevator, A, and a swinging or tilting frame, B, which receives each full sack X from the elevator, and causes its contents to be discharged into an empty sack, Y, suspended from the rear portion of the said frame.

The fixed portion of the apparatus consists of four inclined posts, D D and D' D', connected together above and below by stay-frames E and E'.

The apparatus may be moved about from place to place, in the manner of a truck, upon wheels $a\ a$, hung to arms $b$, which are pivoted to the front posts D, and held rigidly by projections $b'$, and the rear posts D' are also provided with handles $d$ for facilitating the transportation of the apparatus from place to place. When the apparatus is in use and it is necessary it should rest solidly upon its supporting-posts, the wheels $a$, with their arms, are swung round to the position shown in the drawing, where they are retained by the projections $b'$, and the handles $d$ are turned out of the way to the position shown by full lines in Fig. 3.

The operating parts of the apparatus derive their movements, either directly or indirectly, from a transverse shaft, F, having its bearings in the upper stay-frame E, and provided at one end with a cranked handle, $e$, which may be either keyed to the said shaft or have a clutch-connection, $e'$, as shown in Fig. 2. The shaft has a ratchet-wheel, $f$, provided with a double pawl, $f'$, Figs. 2 and 3, which must be adjusted to a position to accord with the direction of the movement of the said shaft.

The elevator A consists of two side bars, $g\ g$, adapted to guides in the posts D, and connected together by a cross-bar, $g^1$, at the top, and by a board, $g^2$, at the bottom, of sufficient width to support the filled sack.

The required rising-and-falling movement is imparted to the elevator, from the shaft F, through the medium of eccentric drums $h$ on the latter, (which will be more particularly referred to hereafter,) and cords or chains $h^1$, secured at one end to the said drums, and at their opposite ends to the board $g^2$ after passing over grooved pulleys $h^2$ at the top of the posts D. (See Fig. 3, and enlarged detached view, Fig. 4.)

A curved lever, G, is hung to the bottom of the board $g^2$, for a purpose explained hereafter, and to the center of the upper cross-bar $g^1$ of the elevator is secured a device for holding the upper end or mouth of a filled sack resting upon the said board $g^2$. This device may be either a forked hook, H, for holding the mouths of opened sacks, or shears I for holding the sacks in position and cutting the tying-cords at the proper moment, for the purpose of opening the said sacks. The latter device, which I prefer to use in most instances, is illustrated in the enlarged sectional view, Fig. 5, and consists of a hooked blade, $i$, pivoted to the forked end of a rod, $j$, rendered vertically adjustable in a tubular enlargement of the cross-bar $g^1$, and of a blade, $i^1$, pivoted to the said blade $i$, and connected to the rod $j$ by a link, $i^2$. The four pivoting-points of the shears bear such relation to each other that a movement in the direction of the arrow, Fig. 5, will cause the blades to approach and cross each other, and a reverse movement their separation. A movement in the direction of the arrow is automatically effected, under the circumstances described hereafter, by a cord or chain, $k$, which connects the long arm $i^3$ of the lever or blade $i$ with one of the hoisting-chains $h^1$.

The swinging and tilting frame B is constructed of light, but strong, side pieces, connected at suitable intervals by strengtheningrods or cross-bars, which may, if required, be covered with wire-gauze, to form an even bottom for the support of sacks. The said frame is pivoted at its opposite sides, and near its rear end, to the upper extremities of two arms, K K, which are in turn pivoted at their lower ends to the posts D' D' of the fixed frame, and have a limited vibrating movement thereon between stops $l$ $l'$. (See Fig. 3.) In suitable bearings at the opposite sides of the rear portion of the frame B turn two parallel rock-shafts, L and L', arms $m$ $m$ at the extremities of which are connected together by a link, $n$, so that both may be turned simultaneously in opposite directions by a handle, $m'$. The said shafts are provided with sack-holding hooks $p$, which are maintained in the position shown in Fig. 1 by a spring, $w$, acting on one of the arms $m$, Fig. 3, the turning of the shafts by means of the handles $m'$ having the effect of lowering the hooks for the purpose of releasing a sack, as hereafter described. A sliding bar, P, connected at its lower end to rods $q$ $q$, pivoted to the rear posts D' D', and adapted to a slot in the upper stay-frame E, is connected by a cord or chain, $r$, to the operating-shaft F, in such a manner that it shall be raised simultaneously with the lowering of the elevator A, and vice versa. The upper curved end of this bar is adapted to a grooved projection, $s$, on the under side of the frame B, and acts as a tilting device for the latter, as hereafter described, and a forward swinging movement, to the extent permitted by the stops $l$ $l'$, is imparted to the said frame by a rounded projection, $t$, on its under side, which strikes the front edge of the upper stay E. (See Figs. 1 and 3.)

The operation of the apparatus in filling one sack from another—as, for instance, in emptying the contents of a miller's sacks into those of a purchaser—is as follows: The parts of the apparatus having been adjusted to the position shown in Figs. 1 and 2—that is, with the elevator A lowered and the frame B raised, the hooks $p$ are turned inward or lowered by manipulating the handle $m'$, so as to permit the ready attachment thereto of the extended mouth of the empty sack Y, and are then permitted to spring outward, so as to securely retain the said sack. The full sack X is next placed upon the foot-board $g^2$ of the elevator A, and is prevented from toppling over by inserting the hooked blade $i$ of the shears I beneath the cord which closes its mouth. This blade is not sufficiently sharp to cut the cord until the pressure of the other blade $i^1$ is applied, but serves at first as a steadying device only. The shaft F is now turned in the direction of the arrow, Fig. 1, by means of its crank $e$, which will have the effect of winding in the cords or chains $h^1$ upon the eccentric drums $h$, and of thus raising the elevator and sack X, and at the same time of unwinding the cord or chain $r$, which will permit the descent of the sliding bar P, and the lowering of the front end of the frame B, the several parts being, in other words, adjusted by the operation of the shaft F to the position shown in Fig. 3. During the latter portion of this movement, the operating-chain $k$ was tightened, and this caused the blades $i$ $i^1$ of the shears to close upon and cut the tying-cord at the mouth of the sack X, and the front and lower end of the frame B was thrust well under the bottom of the said sack by the striking of its rounded projection $t$ against the front edge of the stay E, which, as before remarked, caused the said frame to be swung forward to the extent permitted by the stop $l'$. A further movement of the parts in the same direction, after they have been adjusted to the position shown in Fig. 3, will cause the tilting-lever G, the inner end of which strikes against the under side of the stay E, to tilt or throw the sack X over onto the frame B with its open mouth upward, but projecting into that of the empty sack Y. The direction of the movement of the shaft F, and of the parts operated by the same, is now reversed, the elevator being simply lowered, while the frame B, with its two sacks, is raised or tilted, by the bar P, to the inclined position shown in Fig. 1, which will cause the discharge of the contents of the sack X into the purchaser's sack Y. The empty sack X and filled sack Y are then removed from the frame B, another empty sack is hooked onto the latter, and a filled sack placed on the elevator, when the operation is proceeded with as before.

If it be preferred to untie the sacks X before they are placed upon the elevator, the shears I may be dispensed with, and the forked hook H used in place of the same as a sack-holder. The said hook, as well as the shears, is rendered vertically adjustable, to suit different lengths of sacks, upon and with the rod $j$, (see Fig. 5,) which has a series of holes, through any of which the retaining-pin may be passed.

I derive considerable advantage from the use of eccentric drums $h$, properly adjusted in respect to the crank $e$, inasmuch as at certain points in each revolution of the crank, where the operator can apply his power to least advantage, the smallest pull is obtained on the chains $h$, whereas in those parts wherein his power can be applied to the best advantage the greatest pull is obtained.

When it is only desired to use the apparatus for raising full sacks for loading a wagon, the frame B is lifted to the position shown in Fig. 1, and there retained in any suitable manner, the chain $r$ and tilting-lever G being disconnected; and, in like manner, when full sacks are to be emptied from a wagon into other sacks suspended from the frame B, the elevator A may be lowered and its chains $h^1$ disconnected.

I claim as my invention—

1. An apparatus for raising, emptying, and filling sacks, in which an elevator, A, is combined with a tilting-frame, B, substantially as herein set forth.

2. The combination, substantially as described, of the shaft F, the elevator A, the tilting-frame B, the cords or chains $h^1$ and $r$, and intermediate devices, whereby the within-described movements may be transmitted simultaneously from the shaft to the said elevator and frame.

3. The combination of the lever G at the base of the elevator with the stay-frame E, or other fixed portion of the apparatus, for the purpose specified.

4. The shears I, consisting of blades $i$ and $i^1$, rod or other support $j$, and connecting-link $i^2$, the whole being combined with the bag-elevating device, and operating substantially as herein described.

5. The frame B, pivoted to arms K K, having a limited movement, determined by stops $l\ l'$ on the fixed portion of the apparatus, all substantially as specified.

6. The combination, with the frame B and its projection $s$, of the sliding bar P, operated by the shaft F through the medium of a cord or chain, $r$, all substantially as specified.

7. The combination of the rounded projection $t$ of the frame B with the stay E, or other fixed portion of the apparatus, for the purpose specified.

8. The combination of the rock-shafts L L', their hooks, the arms $m\ m$, link $n$, handle $m'$, and spring $w$, all substantially as and for the purpose specified.

In testimony whereof I have hereunto set my hand in the presence of two subscribing witnesses.

SAMUEL WILKERSON, JR.

Witnesses:
CHAS. AUBREY DAY,
   Draughtsman, 95 Navarino Road,
      Dalston Rise, London, E.
AVE. LUCAS,
   Clerk to Mr. Bristow Hunt,
      5 Serle Street, Lincoln's Inn, London.